(No Model.)

T. LEES.
SHOVEL OR SCOOP.

No. 360,029. Patented Mar. 29, 1887.

Witnesses.
H. P. Hyams
D. J. Hyams

Inventor:
Thomas Lees

UNITED STATES PATENT OFFICE.

THOMAS LEES, OF TORONTO, ONTARIO, CANADA.

SHOVEL OR SCOOP.

SPECIFICATION forming part of Letters Patent No. 360,029, dated March 29, 1887.

Application filed August 5, 1886. Serial No. 210,241. (No model.)

*To all whom it may concern:*

Be it known that I, THOMAS LEES, a subject of the Queen of Great Britain, residing at No. 75 Sullivan street, in the city of Toronto, Province of Ontario, Canada, have invented certain new and useful Improvements in Shovels and Scoops; and I do hereby declare that the following is a full, clear, and exact description of the invention, which will enable others skilled in the art to which it appertains to make and use the same.

My invention relates to shovels and scoops, the object being to provide the same with raised surfaces on the under side, so as to remove the friction, when in use, from the entire under surface and confine the same to the raised surfaces only, said raised surfaces being suitably distributed, so as to protect the mouth as well as the heel of the article. The raised surfaces may be made by simply countersinking the blade of the shovel or scoop when the same is stamped or pressed to the desired shape, or by having pieces specially prepared and welded or otherwise secured in position.

Heretofore shovels and scoops have been made with a plain under surface, and the friction, when in use, has exercised a grinding and destructive effect on the entire surface, as well as that part where the blade and handle-socket are joined, causing the articles to wear out at the mouth and heel very rapidly.

My invention consists in providing raised surfaces of any desired shape and size so distributed on the under side of the blade of a shovel or scoop as to protect the main portion of the same, and particularly the mouth and heel, from the wearing effect of the friction caused in the ordinary use of the same, said raised surfaces relieving the balance of the under side of the blade from the destruction consequent on the same being, as at present, unprotected.

Figure 2:
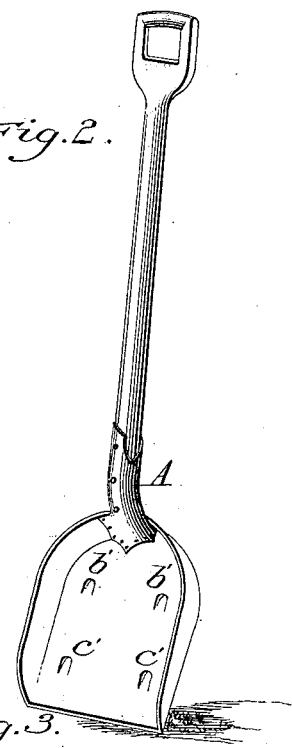
Figure 1:
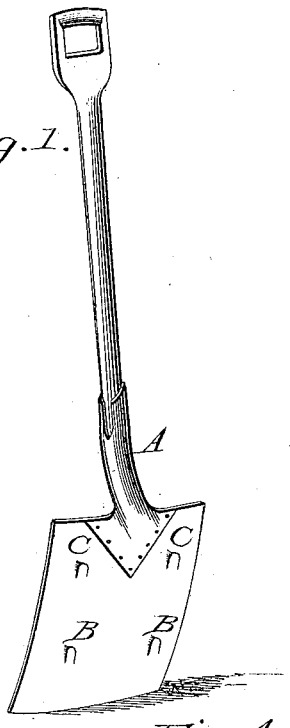
Figure 3:
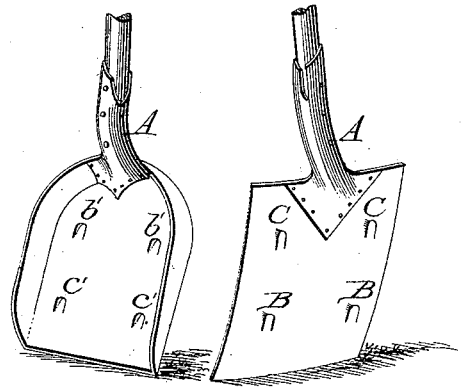
Figure 4:
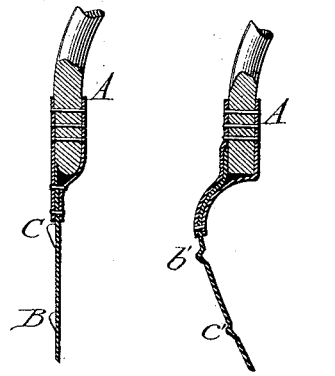

In the drawings, Figure 1 is a perspective view of a shovel, showing the under side of the blade as well as the raised surfaces for the protection of the mouth and heel of the same. Fig. 2 is a perspective view of a scoop, showing the upper or concave surface and the indentations in said surface caused by the countersinking of the raised surfaces on the under side of the same. Fig. 3 is a perspective view of the under sides of the blades of a shovel and scoop with the handles broken away near the center, showing clearly the raised surfaces and the angular position and location of the same. Fig. 4 is a section of Fig. 3 on the line $xx$, showing the raised surfaces on the under sides of the shovel and scoop, both countersunk and solid and both intended for the same purpose.

The same letters of reference denote corresponding parts in all the figures.

Referring to the drawings, A represents the shovel or scoop as at present used as to general shape; B B, the raised surfaces on the under side of the blade, designed to protect the mouth of the same. (I do not desire it to be understood that but two of these raised surfaces are to be employed, but any number, from one up.) These raised surfaces may be made either by countersinking in the die or press when the blade of the shovel or scoop is brought to the desired shape, or made solid, as shown in Figs. 1, 3, and 4, and welded or otherwise secured in position.

C C are the raised surfaces, designed to protect the heel or that portion of the blade where the handle-socket is joined, (and I claim the same latitude as to the number to be employed here, as before stated, with respect to the protection of the mouth.)

$b'$ $b'$ are the raised surfaces, as are $c'$ $c'$, (shown in Figs. 2, 3, and 4,) designed for the protection of the mouth and heel of the scoop, similar in every particular to that of the shovel.

The protection which the raised surfaces afford will render the durability of a shovel or scoop at once apparent, and at a trifling increase in the cost of production, without detracting in the smallest degree from its usefulness.

Having thus described my invention, what I claim as new, and desire to secure by Letters Patent, is—

1. A shovel or scoop provided with raised surfaces formed in the plate of which the blade is composed, said convex raised surfaces being on the under side of said plate for the protection of the same, substantially as and for the purpose specified.

2. A shovel or scoop provided with solid raised angular convex surfaces on the under side of and integral with the blade for the protection of the parts known and described as the "mouth" and the "heel" of said blade, substantially as and for the purpose described.

In testimony whereof I affix my signature in the presence of two witnesses.

THOMAS LEES.

Witnesses:
FREDK. J. DANNATT,
CHARLES W. WAGNER.